United States Patent
Neubert et al.

(10) Patent No.: US 6,913,153 B2
(45) Date of Patent: Jul. 5, 2005

(54) COMPOSITE MEMBRANE

(75) Inventors: Joachim Neubert, Aidlingen (DE);
Karl-Ferdinand Staab, Weil der Stadt (DE)

(73) Assignee: Susanne Neubert (DE)

( * ) Notice: Subject to any disclaimer, the term of this patent is extended or adjusted under 35 U.S.C. 154(b) by 197 days.

(21) Appl. No.: 10/258,212

(22) PCT Filed: Apr. 12, 2001

(86) PCT No.: PCT/EP01/04218

§ 371 (c)(1),
(2), (4) Date: May 27, 2003

(87) PCT Pub. No.: WO01/83090

PCT Pub. Date: Nov. 8, 2001

(65) Prior Publication Data

US 2003/0179530 A1 Sep. 25, 2003

(30) Foreign Application Priority Data

Apr. 19, 2000 (DE) .......................... 100 19 287

(51) Int. Cl.$^7$ ............................................. B01D 69/10
(52) U.S. Cl. ..................... 210/488; 210/97; 210/245; 210/321.75; 210/321.84; 210/356; 361/103
(58) Field of Search ................. 210/97, 245, 321.75, 210/321.84, 356, 488; 361/103

(56) References Cited

U.S. PATENT DOCUMENTS 4,161,013 A * 7/1979 Grodzinsky et al. ........ 361/500

FOREIGN PATENT DOCUMENTS

DE          4210413 A1 * 10/1993   ........... B01D/17/02
WO    WO 200054866 A1 *  9/2000    ............. A61F/2/02

* cited by examiner

Primary Examiner—W. L. Walker
Assistant Examiner—K S Menon
(74) Attorney, Agent, or Firm—McNair Law Firm, P.A.

(57) ABSTRACT

The invention relates to a composite membrane (1) consisting of a flat support body (2) comprising relative big through flow holes (3) and on which at least one separating layer is applied as a membrane layer (4) having a given number of pores and pore sizes. In order to regulate the temperature of the support body, said support body (2) is connected to a device (5) that can be regulated by a regulating device (S) with the purpose of supplying a predetermined energy to the support body (2) and/or diverting energy from the support body (2). The membrane layer (4) is applied on the support body (2) in a heat-conductive manner so that any change in the temperature of the support body provokes a change in the temperature of the membrane layer. The membrane layer (4) consists of at least one temperature-dependent, expanding membrane material that includes pores and/or defines pores so that the size of the pores can be changed and regulated by means of the regulatable body temperature and, hence, by means of the indirectly regulatable temperature of the membrane layer as a result of the expansion-temperature sensitivity of the membrane material.

20 Claims, 1 Drawing Sheet

COMPOSITE MEMBRANE

Figure 1:
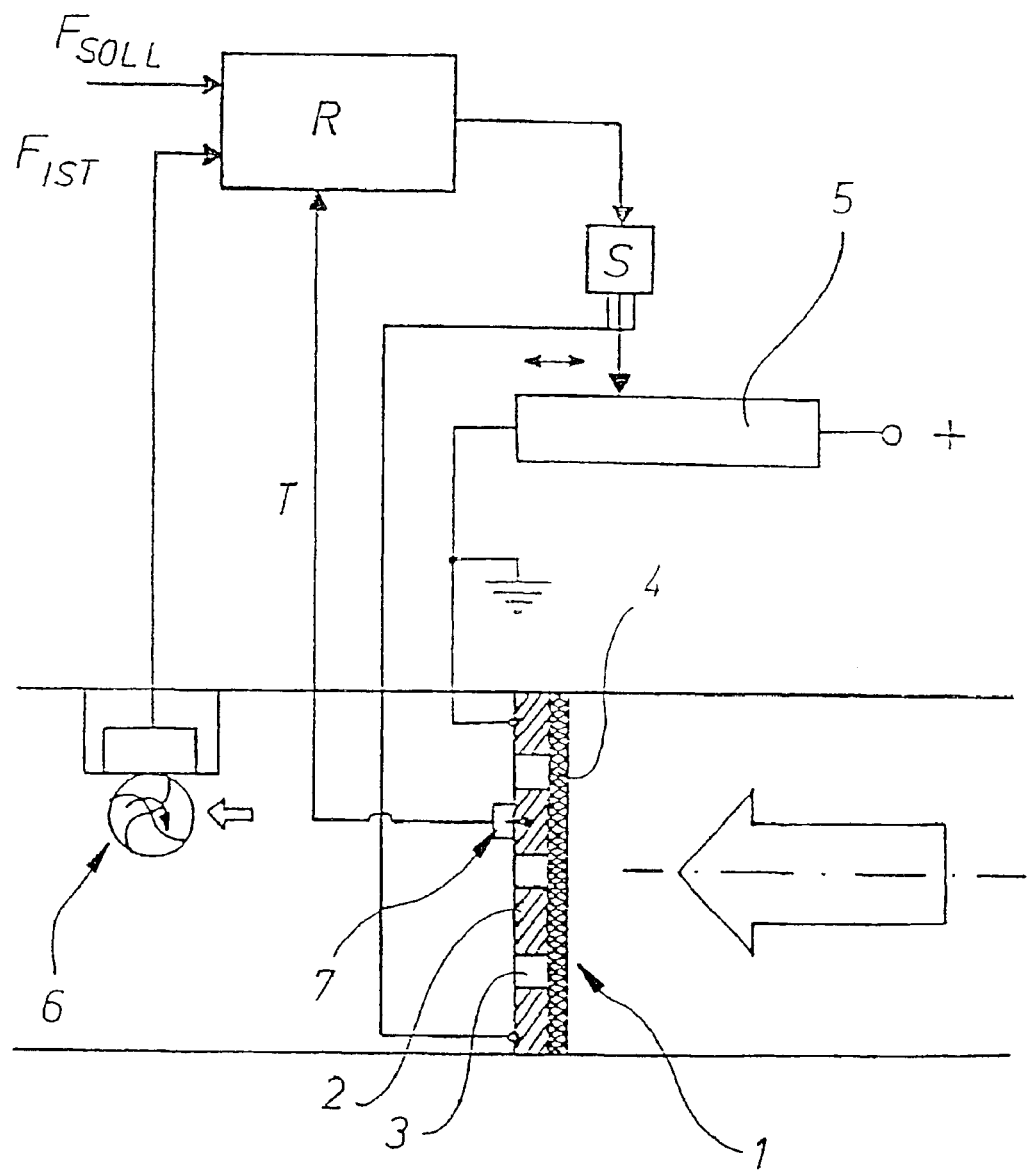

This application is a 371 of PCT/EP01/04218 of Apr. 12, 2001 and claims priority over the German application 10019287.4 of Apr. 19, 2000.

The invention relates to a composite membrane according to the introductory clause of claim 1.

In general, membranes for solutions and suspensions made of multiple membrane materials are known that have as a rule good separating effect but low flux, even at increased membrane pressure. Flux or flux-capacity is here understood to be the supporting liquid going through in $1/(m^2 \times h)$ or $m^3/(m^2 \times h)$. The reduction of flux with these generally known membranes is caused by the fact that the energy consumption increases considerably at higher overflow rates combined with high friction loss. The overflow rate in m/s is understood to be the speed at which the suspended liquid containing materials flows over the membrane surface. At a low overflow rate such generally known membranes tend to foul, i.e. to cause the deposit of the separated substances on the membrane surface, so that a further disadvantageous reduction of the flux results due to increased resistance.

A previously known membrane of this type (DE 42 10 413 A1) consists of a flat supporting body with relatively large flow-through openings on which a layer with a separation function consisting of a composite of a granular filling material and a bonding agent is layered. In this case the supporting body represents a sustaining frame for a membrane layer made of a bonded, powdery filling material, whereby the powdery body and the bonding agent are of such nature that the separating function layer has pores through which the supporting liquid is able to pass continuously, whereas the materials to be separated are essentially held back.

In an actual embodiment of such a membrane the function layer is applied in several layers during manufacture, whereby each application is followed by drying and heating as well as sintering of the layer. These applied layers are identical in structure and composition, so that the build-up by layers is used only to produce an overall greater layer thickness with a separating function layer of throughout uniform structure and composition. In mixing bonding agent and filling material, in particular in the actually indicated proportion of 30% to 70%, basically more favorable conditions are obtained than with the generally known membranes mentioned initially with regard to the internal flow resistance of the membrane, these being however again reduced as the number of built-up layers of uniform structure and thereby the layer thickness of the separating function layer increases. With the actually used bonding agent polyether sulfone, yet another disadvantage results in view of the hydrophilic nature of the membrane.

It is the object of the invention to further develop a membrane of this type so that the internal flow resistance of the membrane can be reduced by targeted influence, and thereby the flux can be increased correspondingly, without decreasing the retention effect on the substances to be separated while a lower overflow rate is required.

This object is attained through the characteristics of claim 1.

According to claim 1, in order to set a given temperature of the supporting body, the supporting body is connected to a device that can be adjusted by an adjusting device for a predetermined supply of energy to the supporting body and/or derivation of energy from the supporting body. The membrane layer is applied in a heat-conducting manner on the supporting body so that a change in the temperature of the supporting body also causes a change in the temperature of the membrane layer. The membrane layer consists of at least a portion of membrane material expanding in function of temperature and containing or delimiting pores.

It is thereby possible to vary and to adjust the effective pore size by means of the expansion and temperature adjustment of the membrane material by exerting a targeted influence on the adjustable supporting body temperature and thereby on the indirectly adjustable membrane layer temperature. The extent of variation of pore width is here essentially dependent upon the extent of expansion and temperature of the membrane material and on the possible temperature variation of the membrane layer temperature. If for example a membrane material is used that expands as the temperature rises, the pore width is constricted at increasing temperature and the pores become smaller. Analogous to a control valve, the flux can thus be controlled through the controlled pore width.

The pore width of such a composite membrane can thereby be adapted to each type of utilization, whereby the flux capacity can be increased without an increase of the required trans-membrane pressure as with the known membranes. At the same time the necessary overflow rate of the liquid containing the materials to be separated can be decreased significantly without decreasing the flux.

Thereby an outstanding measure is made available to adapt and to optimize a composite membrane, starting with an already produced standard membrane with a basic pore size to different situations and current operating conditions through simple and direct modification of the pore size. It is in particular possible thereby to lower the internal flow resistance of the membrane distinctly according to the prevailing laminar flow conditions in order to increase the permeate performance, without causing a reduction of the retention effect on the substances to be separated.

According to claim 2, the supporting body contains at least a portion of an electrically conductive material and is connected to a controlled electrical energy source. Thereby the supporting body is used in an especially simple design directly as an ohmic heater to achieve temperature variation. In case of a non-conductive supporting body material, a composite of electrically conductive and non-conductive materials can also be used according to claim 3 in order to obtain an ohmic heater.

For this purpose a weave design in the manner of a micro-sieve is proposed in claim 4, whereby also combinations of several weave layers, in particular of electrically conductive and non-conductive material can be used. If necessary, connections/links at the crossing points can be established to increase stability.

In a special embodiment according to claim 5, the supporting body is constructed of a hollow-fiber material that reacts flexibly to pressure differences in a liquid environment by changing the hollow space. Thereby the consistency and volume expansion of the supporting body, together with the membrane layer (at least one) applied to it can be influenced, in addition to the previously mentioned temperature influence, also by variation of the liquid pressure. Thereby a further and if applicable additional measure is made available to influence the function and optimize the membrane.

The membrane structure and membrane materials used may not show permanent changes within the temperature ranges used, and in addition they must remain stable in the presence of the chemicals in the supporting liquid. With the characteristics of claim 6, structures and materials are proposed for the supporting body that can be used in one or several layers of the same material or in combinations, depending on the conditions and individual cases.

For a suitable adjustment and optimization of the pore size in the (at least one) membrane layer, it is advantageous to measure the permeate flow. For this a permeate quantity measuring device is installed in a permeate conduit. Depending on the value measured by this measuring device, the membrane temperature can then be adjusted for the control of the permeate stream, e.g. manually.

In an especially preferred, continued embodiment according to claim 7, the arrangement is designed as a closed control circuit for temperature control and/or permeate quantity control. For this purpose the measured value is conveyed from a permeate quantity measuring device and/or a temperature measuring device on the membrane in form of actual value to a regulator, preferably a continuously operating regulator, into which a predetermined target value is entered. The permeate quantity is regulated advantageously. To improve regulation, the membrane temperature can be locked on in addition as influence quantity and can be taken into consideration. Furthermore additional physical influences, e.g. the temperature of the liquid and/or the overflow rate and/or the trans-membrane pressure can be measured and taken into account in regulating. Thereby an arrangement is advantageously created that adapts itself automatically and optimally to different situations and changing operating conditions. In addition the measuring results can also be used to vary the influence magnitude of influence on the permeate quantity, e.g. to vary the overflow rate. For this too, automatic adaptation and optimization is possible with suitable control algorithms and programs.

The characteristics of claim 8 indicate a design of the membrane layer well suitable for good functioning of the membrane. For this, the membrane layer, of which at least one is applied to the supporting body, consists of a composite of granular filler and a bonding agent. In case of several membrane layers in form of interconnected built up layers superimposed on each other these shall have different structures in such manner that each of the built up layers in succession and in steps will contain a smaller portion of filler and a correspondingly greater portion of bonding agent as compared with a layer preceding it in the direction of the supporting body. The characteristics of claims 9 and 10 indicate further actual, advantageous designs.

Actually tested ratios of bonding agent portions and filler portions as well as filler grain values for the build-up of a micro-filtration membrane, an ultra-filtration membrane and a nano-filtration membrane are contained in claims 11 to 14. According to claim 15, a last build-up layer consisting of bonding agent without any filler can be advantageous for osmosis in reverse.

Suitable materials for filler and bonding agent are indicated in claims 16 and 17, whereby the materials indicated therein can be used singly or possibly in combinations. Electrically conductive and/or well heat-conductive fillers are used to advantage with a connection to corresponding materials of the supporting body, so that the influence of the supporting body continues into the (at least one) membrane layer and so that rapid and effective control in the sense of pore enlargement or pore reduction is possible.

In addition claim 18 provides for a device for the production of a constant or intermittent magnetic field in the area of the composite membrane. By this means scaling can be avoided at the membrane surface, in that the charge in a possible ion layer on the membrane surface is influenced in the sense that no impermeable layer can occur. This serves as additional stabilization of the flux performance of the membrane.

If necessary, the overflow rate can be selected to be relatively high in order to obtain a large quantity of permeate when using the optimized composite membrane according to the invention, so that fouling becomes impossible. At the same time the formation of deposits within the laminar limit layer and the additional filter resistance resulting from it are minimized.

Such a composite membrane according to the invention is advantageously used according to claim 19 to separate dissolved or suspended materials from organic or non-organic liquids or to break down liquid material mixtures into their components.

The invention is described in further detail through a drawing.

The sole FIGURE schematically shows a composite membrane 1 comprising a flat supporting body 2 with relatively large flow-through openings 3, whereby a layer 4 with a separating function and shown here schematically merely as an example is applied as a membrane layer with a given number pores and pore size is applied on the supporting body 2.

The supporting body 2 contains at least a share of electrically conductive material, whereby the electrically conductive material is incorporated into the supporting body continuously and/or as containing a core and/or in layers as an organic or inorganic material, preferably as a metallic material.

As is further shown in FIG. 1, the supporting body 2 is connected by an adjusting device S to an adjustable device 5 for predetermined energy supply to the supporting body 2 or for energy derivation from the supporting body 2 in order to set a given supporting body temperature. As shown in the schematic representation of FIG. 1, the adjustable device 5 connected electrically to the supporting body 2 is made here in form of an electric energy source, so that the supporting body 2 can be used as an ohmic heater.

The adjusting device S and the adjustable device 5 are made in form of a closed control circuit for temperature control and/or permeate quantity control, whereby the measured value obtained from a permeate quantity measuring device 6, shown here merely as an example and schematically in form of a measuring wheel, and from a temperature measuring device 7 installed on the composite membrane 1, is transmitted as an actual value to a regulator R operating preferably on a continuous basis. An actual value that can be predetermined is entered into this regulator R, whereby the membrane temperature and/or liquid temperature and/or overflow rate and/or the trans-membrane pressure are measured and can be taken into account in the control circuit.

The layer 4 with separating function is applied in a heat-conducting manner on the supporting body 2 so that a change in supporting body temperature also results in a change in membrane layer temperature.

The layer 4 with separating function consists of at least a part of a membrane material that expands in function of temperature and contains pores and/or delimits pores so that it is possible through targeted influence on the adjustable supporting body temperature and thereby through the thereby indirectly adjustable membrane layer temperature to vary and adjust the effective pore size by means of the expansion and temperature changes of the membrane material. The extent of variation of pore width is here mainly prescribed by the expansion and temperature changes of the membrane material and by the possible variations in the membrane layer temperature. Thus for example, when a membrane material is used that expands with rising temperature, the pore width of the included pores becomes smaller as the temperature rises, so that the flux can be controlled through the controllable pore width, similarly as with a control valve.

What is claimed is:

1. A composite membrane including a membrane layer having a given quantity of pores of a given pore size for separating liquids and filtering material from liquids, said composite membrane comprising:

a supporting body with relatively large flow-through openings providing a frame for receiving at least one membrane layer;

an electrically conductive material included in said supporting body made from organic or inorganic components;

an adjustable energy device electrically connected with at least one of said electrically conductive material and said supporting body for delivering or depriving a supply of energy to the supporting body so that the electrically conductive material in the supporting body acts as an ohmic heater in order to adjust the temperature of the supporting body;

a membrane layer applied to the supporting body in a heat-conducting arrangement so that a change in supporting body temperature results in a change in membrane layer temperature; and an expandable membrane material included in said membrane layer that expands as a function of temperature to alter the size of the pores in the membrane layer;

whereby the pore size of the membrane layer can be adjusted by changing the temperature of the supporting body in order to adapt the flux capacity of the membrane layer to the particular utilization without increasing pressure on the membrane layer.

2. The composite membrane of claim 1 wherein the electrically conductive material is contained as a core within portions of the supporting body for heating the supporting body and said membrane layer.

3. The composite membrane of claim 1 wherein the electrically conductive material is a metallic material layered throughout the supporting body for heating the supporting body and said membrane layer.

4. The composite membrane of claim 1 wherein the supporting body is constructed and arranged using electrically conductive material formed as a micro-sieve weave pattern capable of supporting the membrane layer while allowing liquids to permeate the supporting body.

5. The composite membrane of claim 1 wherein the supporting body comprises a micro-sieve weave of material selected from the group consisting of conductive and non-conductive metals, synthetics, ceramic filters with large pore width, synthetic filters with large pore width, fiberglass weave, textile web, and web made of synthetic materials.

6. The composite membrane of claim 1 wherein said supporting body is comprised of a hollow-fiber material that reacts flexibly to pressure differences in liquid surrounding the hollow-fibers by expanding or constricting the hollow space within the fibers based on the exerted liquid pressure.

7. The composite membrane of claim 1 including a control unit operatively associated with said adjustable energy device for adjusting the supply of energy from the adjustable energy device to the support body so that the temperature of the supporting body, and thereby the pore size of the membrane layer, may be adjusted.

8. The composite membrane of claim 7 including a temperature measuring device carried by said membrane layer for ascertaining the actual temperature value of the membrane layer.

9. The composite membrane of claim 7 including a permeate quantity measuring device disposed adjacent said supporting body for measuring the flow of liquid through said membrane layer, and a temperature measuring device carried by said supporting body for ascertaining the actual temperature value of the support body and thereby the membrane layer.

10. The composite membrane of claim 9 including a regulator in electronic communication with said permeate quantity measuring device, said temperature measuring device, and said control unit; said regulator registering the actual permeate quantity of the liquid and actual temperature of the supporting body and signaling said control unit to adjust said adjustable energy device to supply or deprive energy to the supporting body to adjust the pore size of the membrane layer to achieve predetermined target values of the regulator for temperature and liquid flow.

11. The composite membrane of claim 1 wherein said membrane layer is a composite of granular filler and a bonding agent applied to the supporting body in individual structural membrane layers on one side of the supporting body, each of the structural membrane layers having a different proportion of filler and bonding agent so that each new structural membrane layer being added includes a smaller portion of filler and a correspondingly greater portion of bonding agent than the previous structural membrane layer.

12. The composite membrane of claim 11 wherein each of the successively installed structural membrane layers has a smaller portion of granular filler and a correspondingly smaller grain size used as the granular filler.

13. The composite membrane of claim 11 wherein said membrane layer includes a first structural membrane layer forming a micro-filtration membrane layer containing bonding agent in the range of 15% to 20% in weight for granular filler in the range of 80% to 85% in weight.

14. The composite membrane of claim 13 wherein said membrane layer includes a second structural membrane layer forming an ultrafiltration membrane layer containing bonding agent in the range of 30% to 35% in weight for granular filler in the range of 65% to 70% in weight.

15. The composite membrane of claim 14 wherein said membrane layer includes a third structural membrane layer forming a nanofiltration membrane layer containing bonding agent in the range of 35% to 45% in weight for granular filler in the range of 55% to 65% in weight.

16. The composite membrane of claim 15 wherein said granular filler in said first structural membrane layer has a grain size of $d_1=25\,\mu m$ on average, ranging from $20\,\mu m < 25\,\mu m < 30\,\mu m$, and the filler in the second structural membrane layer has a grain size of $d_2=15\,\mu m$ on average, ranging from $10\,\mu m < 15\,\mu m < 20\,\mu m$, and the filler in the third structural membrane layer has a grain size $d_3 \leq 10\,\mu m$.

17. The composite membrane of claim 11 wherein the last structural membrane layer to be applied consists of bonding agent without any filler.

18. The composite membrane of claim 11 wherein the granular filler is selected from the group consisting of conductive and non-conductive oxide, ceramic, alum, graphite, and the finest ground synthetic materials suitable for forming the particular structural membrane layer.

19. The composite membrane of claim 11 wherein the bonding agent is material selected from the group consisting of hydrophilic and hydrophobic polysulfone, including derivatives thereof, polyvinilidine fluorides. polyaramide, polyamides, polyolefine, polyimide, polyacrylate, polyacetal, polyprene, silicon, and rubber.

20. The composite membrane of claim 1 including a magnetic field device for the production of a constant or intermittent magnetic field in the area of the composite membrane.

* * * * *